United States Patent Office 2,862,931
Patented Dec. 2, 1958

2,862,931

HETEROCYCLIC VAT DYESTUFFS

Wilhelm Schmidt-Nickels, Little York, and David I. Randall, New Vernon, N. J., assignors to General Aniline & Film Corporation, New York, N. Y., a corporation of Delaware No Drawing. Application December 30, 1955
Serial No. 556,415

12 Claims. (Cl. 260—346.2)

This invention relates to novel heterocyclic vat dyestuffs having the formula

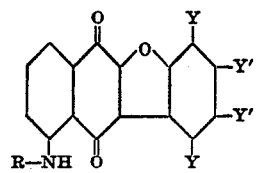

wherein one pair Y—Y' is hydrogen, the other pair Y—Y' is selected from the group consisting of

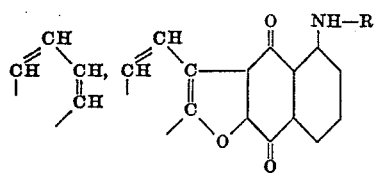

and

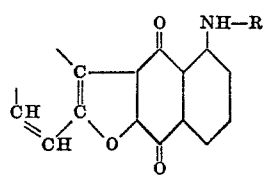

and R is a nuclearly bonded residue of a vattable polycyclic ketone.

The provision of the above described compounds, and methods for their production constitutes the objects and purposes of the instant invention.

The compounds of the instant invention may be prepared by reacting a nuclearly halo substituted vattable polycyclic ketone with a dyestuff intermediate of the formula

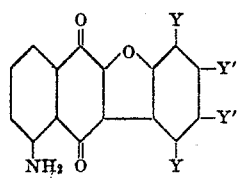

wherein one pair Y—Y' is hydrogen and the other pair Y—Y' is selected from the group consisting of

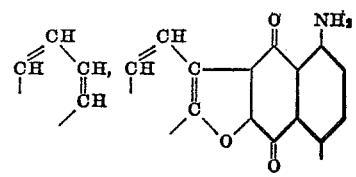

and

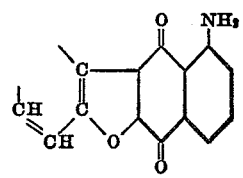

These dyestuff intermediates, and methods for their production are disclosed and claimed in our copending application Serial No. 556,395 filed on even date herewith.

As the vattable polycyclic ketone which may be halogenated, for example chlorinated or brominated, in known manner to provide the above described reactants, there may be mentioned dibenzopyrenequinone, anthanthrone, pyranthrone, dibenzanthrone, isodibenzanthrone, and similar vattable polycyclic ketones well known in the prior art. The nuclearly brominated and chlorinated derivatives of these vattable polycyclic ketones and their methods of production are likewise well known in the prior art.

The reaction is carried out in the presence of an inert organic diluent such as an aromatic hydrocarbon or halogenated aromatic hydrocarbon. As representative of such diluents, there may be mentioned nitrobenzene, chlorobenzene, dichlorobenzene, trichlorobenzene, naphthalene, and the like.

The reaction between the halogenated vattable polycyclic ketone and the above described dyestuff intermediate is carried out in the presence of an alkaline acid binding agent, such as sodium carbonate, potassium carbonate, and the like, and a copper catalyst which may be copper in any form, copper oxide, cuprous chloride, cupric acetate, and the like.

The temperature at which the reaction may be carried out will be dependent upon the particular components present in the reaction mixture, and the diluent employed. Generally, elevated temperatures are preferred, which for example may range from about 100 to 250° C. The optimum temperature in any particular instance will be readily ascertainable by the worker skilled in the art.

It will be similarly apparent that the molar proportions of the reactants to be employed will depend upon the number of halogen atoms in the vattable polycyclic ketone, and the number of free amino groups in the dyestuff intermediate.

The following examples, in which parts are by weight unless otherwise indicated, are illustrative of the instant invention and are not to be regarded as limitative. Unless otherwise indicated, parts by weight are in grams and parts by volume are in cc.

Example 1

A charge of 30 parts by volume nitrobenzene, 1.2 parts by weight dibromdibenzopyrenequinone, 1.6 parts by weight of the compound of the structure

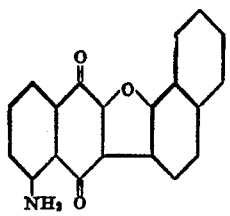

prepared as described in Example 1 of said copending application, 0.5 parts by weight soda ash and 0.2 parts by weight copper powder was stirred at 200–205° C. for 20 hours. The reaction product was filtered off at room temperature, washed with nitrobenzene, acetone, warm water and dried. It has the formula

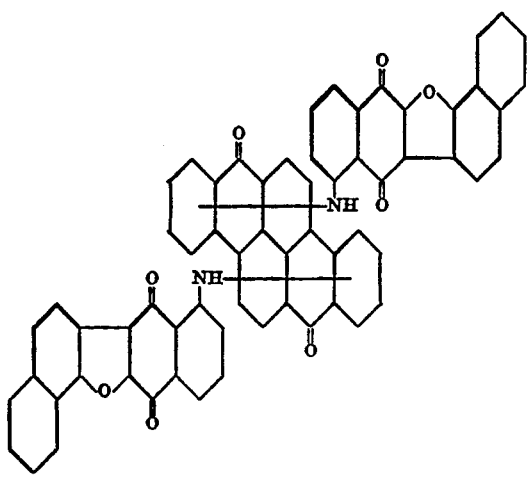

The product dyes cotton from an alkaline hydrosulfite vat strong black-brown shades of good fastness to washing, chlorine and light.

Example 2

A charge of 30 parts by volume nitrobenzene, 1.2 parts by weight dibromdibenzopyrenequinone, 1.6 parts by weight of the compound of the structure

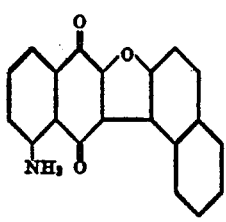

prepared as described in Example 2 of said copending application, 0.5 part by weight soda ash and 0.2 part by weight copper powder was reacted and worked up as described in Example 1.

The reaction product has the formula

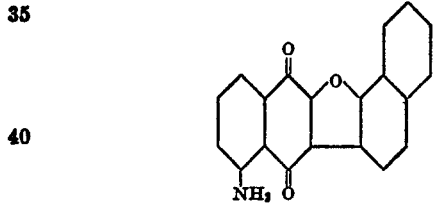

It dyes cotton from an alkaline hydrosulfite vat strong black shades of good fastness to washing, chlorine and light.

Example 3

A charge of 30 parts by volume nitrobenzene, 0.7 parts by weight dibromanthanthrone, 1.0 parts by weight of the compound of the structure 0.3 part by weight soda ash and 0.1 part by weight copper powder was reacted and worked up as described in Example 1.

The reaction product has the formula:

It dyes cotton from an alkaline hydrosulfite vat bluish tinted gray shades of good fastness to washing, chlorine and light.

Example 4

A charge of 45 parts by volume nitrobenzene, 2.9 parts by weight tetrabrompyranthrone, 5.0 parts by weight of the compound of the structure

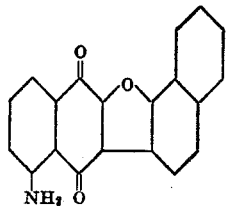

1.7 parts by weight soda ash and 0.5 part by weight copper powder was reacted and worked up as described in Example 1.

The reaction product has the formula

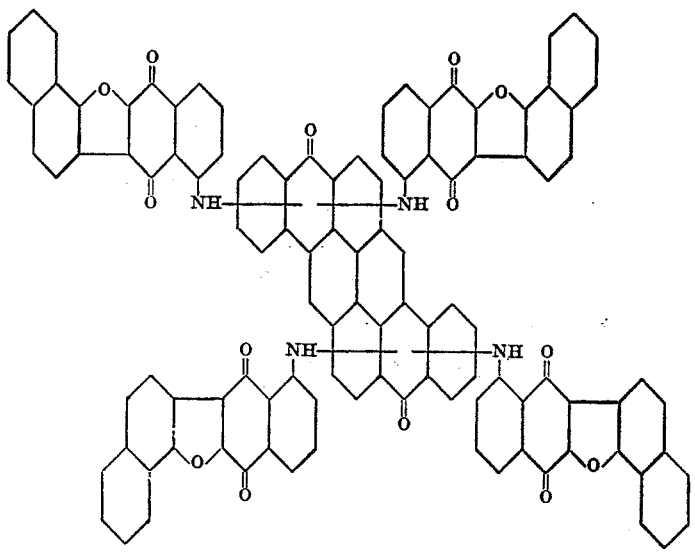

It dyes cotton from an alkaline hydrosulfite vat neutral gray shades of good fastness to washing, chlorine and light.

Example 5

A charge of 30 parts by volume nitrobenzene, 1.4 parts by weight tribromisoviolanthrone, 2.1 parts by weight of the compound of the structure

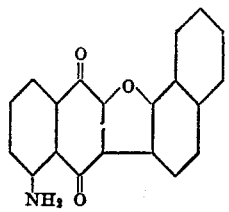

0.6 part by weight soda ash and 0.2 part by weight copper powder was stirred at 200–205° C. for 8 hours and worked up as described in Example 1.

The reaction product has the formula:

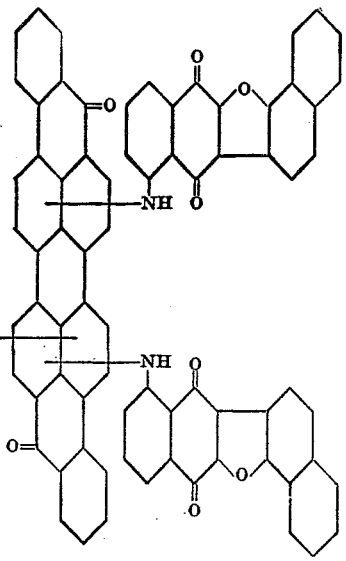

It dyes cotton from an alkaline hydrosulfite vat blue shades of good fastness to washing, chlorine and light.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims. The dyestuffs of the instant invention, produced as above described from vattable ketones containing more than 3 fused rings, have good wash-, light- and chlorine fastness.

We claim:
1. Compounds having the formula

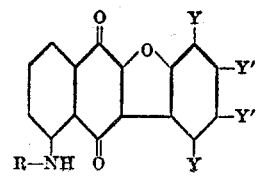

wherein one pair Y—Y' is hydrogen, the other pair Y—Y' is selected from the group consisting of

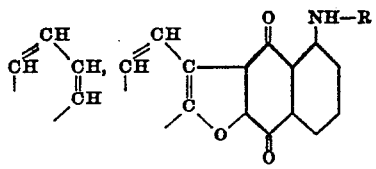

and

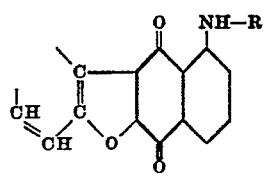

and R is a nuclearly bonded residue of a vattable polycyclic ketone selected from the group consisting of dibenzopyrenequinone, anthanthrone, pyranthrone, dibenzanthrone and isodibenzanthrone.

2. A compound having the formula

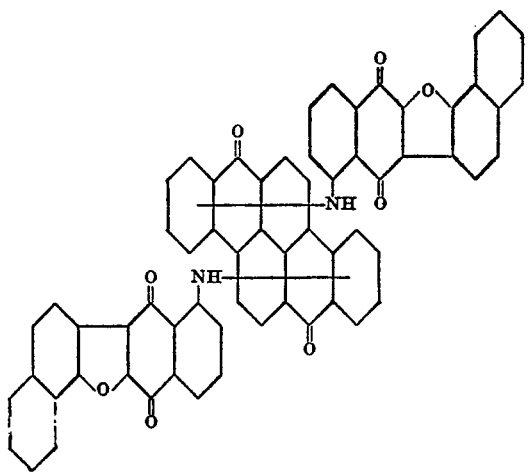

3. A compound having the formula

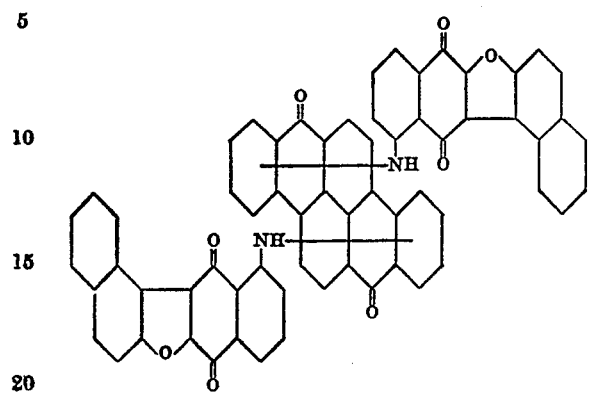

4. A compound having the formula

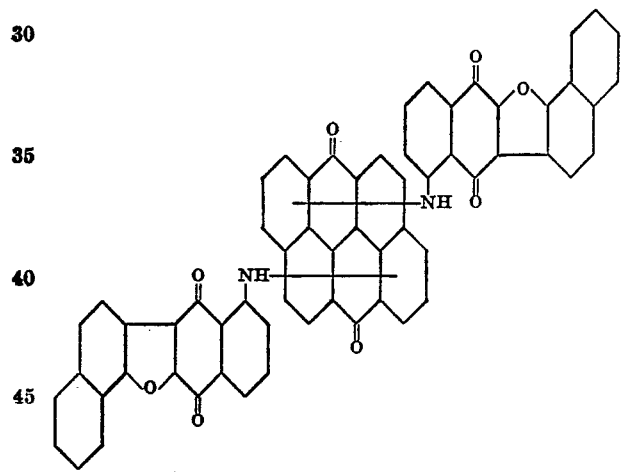

5. A compound having the formula

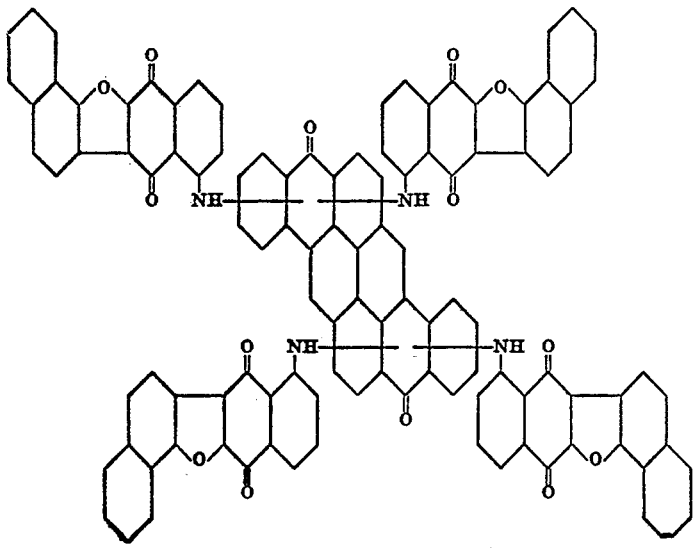

6. A compound having the formula

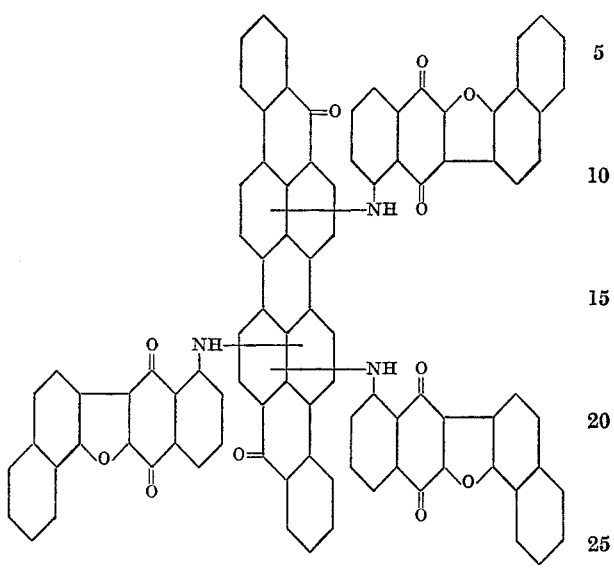

7. A process comprising reacting a nuclearly halo substituted vattable polycyclic ketone selected from the group consisting of dibenzopyrenequinone, anthanthrone, pyranthrone, dibenzanthrone and isodibenzanthrone, with a dyestuff intermediate of the formula

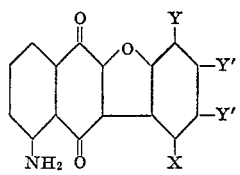

wherein one pair Y—Y' is hydrogen and the other pair Y—Y' is selected from the group consisting of

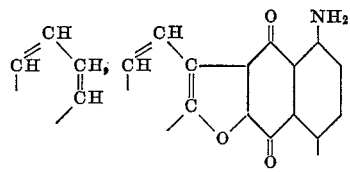

and

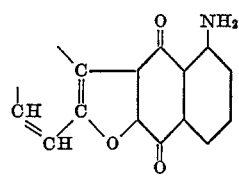

in the presence of an alkaline acid binding agent and a copper catalyst and at an elevated temperature of about 100–250° C.

8. A process comprising reacting dibromdibenzopyrenequinone with a compound having the formula

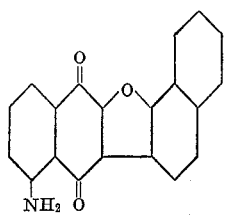

in the presence of soda ash and copper and at an elevated temperature of about 100–250° C.

9. A process comprising reacting dibromdibenzopyrenequinone with a compound having the formula

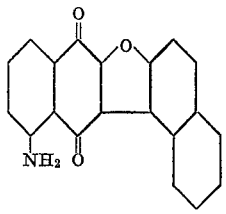

in the presence of soda ash and copper and at an elevated temperature of about 100–250° C.

10. A process comprising reacting dibromanthanthrone with a compounding having the formula

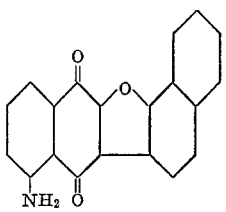

in the presence of soda ash and copper and at an elevated temperature of about 100–250° C.

11. A process comprising reacting tetrabrompyranthrone with a compound having the formula

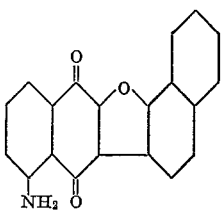

in the presence of soda ash and copper and at an elevated temperature of about 100–250° C.

12. A process comprising reacting tribromisodibenzanthrone with a compound having the formula

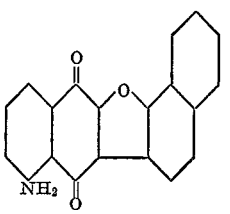

in the presence of soda ash and copper and at an elevated temperature of about 100–250° C.

No references cited.